United States Patent
Konrad

(10) Patent No.: US 10,955,533 B2
(45) Date of Patent: Mar. 23, 2021

(54) SIMULATION APPARATUS FOR A LIDAR LIGHT MEASUREMENT SYSTEM

(71) Applicant: Konrad GmbH, Radolfzell (DE)

(72) Inventor: Michael Konrad, Radolfzell (DE)

(73) Assignee: KONRAD GMBH, Radolfzell (DE)

( * ) Notice: Subject to any disclaimer, the term of this patent is extended or adjusted under 35 U.S.C. 154(b) by 141 days.

(21) Appl. No.: 15/983,141

(22) Filed: May 18, 2018

(65) Prior Publication Data

US 2019/0162829 A1    May 30, 2019

(30) Foreign Application Priority Data

May 18, 2017   (DE) ..................... 10 2017 110 790.8

(51) Int. Cl.

| | |
|---|---|
| *G01S 7/486* | (2020.01) |
| *G01S 17/89* | (2020.01) |
| *G01S 7/481* | (2006.01) |
| *G01S 7/491* | (2020.01) |
| *G01S 7/4865* | (2020.01) |
| *G01S 7/497* | (2006.01) |
| *G01S 7/4915* | (2020.01) |

(52) U.S. Cl.
CPC .......... *G01S 7/4865* (2013.01); *G01S 7/4818* (2013.01); *G01S 7/497* (2013.01); *G01S 7/4915* (2013.01); *G01S 17/89* (2013.01)

(58) Field of Classification Search
CPC ...... G01S 7/4865; G01S 7/497; G01S 7/4818; G01S 7/4915; G01S 17/89
USPC ....................................................... 356/5.01
See application file for complete search history.

(56) References Cited

U.S. PATENT DOCUMENTS

2010/0305904 A1   12/2010   Blanco

FOREIGN PATENT DOCUMENTS

| DE | 3908273 C1 | 5/1990 |
|---|---|---|
| DE | 10146808 A1 | 4/2003 |
| DE | 102007057372 A1 | 5/2009 |
| EP | 0601872 A1 | 6/1994 |

OTHER PUBLICATIONS

Translation into English, with corresponding German text, of the Description of DE102007057372, created May 31, 2020 (Year: 2020).*
European search report for application No. 18173068.0-1206 dated Oct. 15, 2018.

* cited by examiner

*Primary Examiner* — Daniel L Murphy
(74) *Attorney, Agent, or Firm* — Bachman and Lapointe PC; George Coury

(57) ABSTRACT

A simulation apparatus for a lidar light measurement system having a lidar light reception sensor (1), wherein a light transmitter (12) is present in the plane of the lidar light reception sensor (2).

10 Claims, 1 Drawing Sheet

SIMULATION APPARATUS FOR A LIDAR LIGHT MEASUREMENT SYSTEM

TECHNICAL FIELD

The invention relates to a simulation apparatus for a lidar light measurement system and a method for simulating a detection environment for a lidar light reception sensor.

PRIOR ART

In addition to further applications, lidar (abbreviation for light detection and ranging) light measurement systems are used for optical distance and speed measurement. Lidar light measurement systems emit light and measure the time-of-flight, in which the light returns to the lidar light measurement system after the reflection at an object. The distance of the object from the lidar light measurement system follows from the known speed of light. Depending on the design of a lidar light measurement system, distance measurements in the range of a few centimeters to several hundred thousand kilometers are possible.

Important fields of application for lidar light measurement systems have a measurement range for the distance from approximately 1 m to a few 100 m. Examples of these fields of application include mobile instruments for optical distance measurement and lidar light measurement systems for the automotive field of application, namely for driver assistance systems and autonomous driving.

A method for carrying out measurements at defined distances is required for the test of the lidar light measurement systems, for example within the scope of industrial quality control. In the simplest case, this requires measuring sections of these defined lengths. For quality control purposes, there is also the need of defined ambient conditions in respect of the environment, such as temperature, humidity and stray light along the measuring section, and of defined optical properties of the object to be measured. Observing the ambient conditions represents a significant demand on the spatial requirements for measuring sections. Therefore, it requires much outlay to realize testing sections for distances above a length of approximately 10 m.

If the lidar light measurement system is equipped with a plurality of channels which record an image with an aperture angle in a manner analogous to a conventional camera, there is a further increase in the spatial requirements in comparison with linear distance measurement systems. A measurement space with a diameter of 200 m and a height of 83 m is required for a lidar light reception sensor with a horizontal aperture angle of 360°, a vertical aperture angle of 45° and a maximum measurement distance of 100 m.

In addition to the simple test of lidar light measurement systems at fixed distances, there is the demand on a test system to provide a moving scenery. In particular, this is necessary to test lidar sensors in the application development. By way of example, in order to test the behavior of lidar light measurement systems in the autonomous driving application, it is necessary to carry out runs where sensor data are recorded. However, only this scenery of the performed run can then be tested. Changes which are necessary in the development of the application, for example, require a new measuring run.

SUMMARY OF THE INVENTION

It is the problem of the present invention to overcome the disadvantages from the prior art. In particular, the intention is to provide a simulation apparatus which facilitates the function and quality control in a cost-effective manner and which should lead to time being saved in the process.

The features disclosed herein lead to the solution of the problem.

Advantageous configurations are specified in the dependent claims.

The invention allows presenting the lidar light measurement system with any moving scenery. In place of the time-delayed light signal returning to the sensor from the measurement object in the case of a measuring section, the time-delayed light signal is generated by way of an adjustable retardation section.

The light signal emitted by the lidar light measurement system is detected by a photodetector and the further propagation is blocked, for example by way of a light trap. The time of detection of the light signal emanating from the lidar light measurement system is used as a trigger time for producing the time-delayed signal.

A signal that is delayed in time in relation to the trigger is generated. In the invention, the time retardation can be set and modified as desired above a minimum retardation caused by the electronics. The time-delayed signal is produced by means of an electronic time retardation unit. The change in the time retardation is likewise brought about electronically and preferably in a range of >10 s−1. The time-delayed signal is used to produce a light signal by means of a suitable fast amplifier.

The light signal produced thus is guided onto the lidar light measurement system and interpreted by the latter as an object at a distance corresponding to the retardation time.

Each channel of the lidar light measurement system has such a signal chain that is independent of the other channels. As a result, it is possible to generate a simulated moving environment for the lidar system.

Producing changeable time-delayed signals that correspond to a moving 1-dimensional to 3-dimensional scene, which is adapted to the scenery in a manner synchronous to the time-of-flight.

Scalability in the number of channels from one channel up to the resolution of the employed optical system for measuring distances Scalability in the distance proceeding from a minimum distance, which is bounded by the reaction speed of the employed electronic components for detecting light pulses via the time retardation members up to the light production, up to the maximum capture range of the optical system.

Particularly for use in a time-synchronous combination of a plurality of different sensor simulators for visualizing virtual realities.

Particularly for the field of ADAS (advanced driver assistance systems)

Adjustability of a static time delay, which corresponds to a static distance.

The simulation apparatus according to the invention is provided for a lidar light measurement system. Here, special attention is directed to a lidar light reception sensor. Within the scope of function and quality control of such lidar light reception sensors, relatively large also scenic superstructures are regularly required, preventing swift controls. Persons and objects are constructed at different distances from the lidar light reception sensor in these superstructures. Subsequently, a lidar light transmitter is activated in order to derive the distance from the time needed for reflection from the persons and articles back to the lidar light reception sensor. In the solution according to the invention, the lidar light transmitter is not needed. Instead, the construction is replaced by a light transmitter. Here, the light transmitter is used in such a way that it is perceived like the reflection of the lidar light transmitter by the light reception sensor. Here, the light reception sensor is fastened in static fashion. The light transmitter is held in the same plane. This means that the light transmitter is attached at a height above the ground so that the emitted light signal propagates directly and substantially parallel to a ground.

Moreover, a further light transmitter is arranged next to the light transmitter in the plane of the light reception sensor. This means that, in turn, the light reception sensor is activatable from different directions by the light signal of the light transmitter or a further signal of the further light transmitter. Now, if the time duration between the activation of the light reception sensor and the first light transmitter is shorter than that of the activation of the light reception sensor and the registration of the further light signal of the further light transmitter, the light reception sensor has the impression that the light transmitter is closer than the further light transmitter. In reality, both light transmitters are stood next to one another at the same distance from the light reception sensor.

In a preferred exemplary embodiment, the light transmitter and the further light transmitter are each on an optical fiber head. The use of optical fiber lines harbors the advantage that there are no unwanted delays when enabling the light signal to produce the light signal and the light reception sensor consequently obtains a realistic image at the actual time dimensions.

Further, a computer which controls the light reception sensor is present. The computer determines the activation of the light reception sensor and moreover coordinates the actuation of the light transmitter and of the further light transmitter, and consequently also the time interval between activation of the light reception sensor and the two light transmitters. In the process, the computer also registers whether the light reception sensor is operating correctly and is dividing the different time intervals into corresponding spatial distances.

Here, the computer thus serves to monitor and control the enablement of the light reception sensor and the time interval for emitting a light signal via the light transmitter or of the further light transmitter, with the signal input of the light signal from the light transmitter or the further light transmitter likewise being registered.

In another preferred exemplary embodiment, a lidar light signal of the lidar light transducer is activated in the light transmitter and/or further light transmitter by an amplifier, a comparator, a retardation member and an LED driver or laser diode driver an LED or laser diode. As a result, separate light sources are no longer required. Rather, the lidar light signal can be forwarded into the light transmitter or the further light transmitter depending on requirements and also on the desired time interval between emission and reception. Here, the retardation member, for example, is tasked with the object of forwarding the emitted lidar light signal only after a defined time for said light signal to be guided back to the light reception sensor again.

Further, the light transmitter and the further light transmitter are aligned statically in a holder in a circumference of up to 360°, centrically with respect to the light reception sensor. In addition to the light transmitter and the further light transmitter, it is possible to arrange an undefined number of other light transmitters next to one another in the same plane. In this way, it is possible to obtain an image of the surroundings to be detected that is as complete as possible. The holder of the individual light transmitters is designed in such a way that they all are arranged substantially in the same plane, i.e., the same height over a common ground, and are detectable by the light reception sensor.

Further, a method for simulating a detection environment for a light reception sensor having a light transmitter and a further light transmitter, which is attached next to the light transmitter in the same plane as the light transmitter, is claimed, wherein the following method steps are carried out:
the light reception sensor is activated,
the light transmitter emits a light signal after a defined time,
the light reception sensor registers the light signal.
Further, the further light transmitter emits a further light signal after a further activation of the light reception sensor, wherein the light reception sensor registers the further light signal.

By all means, the light signal and the further light signal can be emitted synchronously in time. By way of example, the light reception sensor would be able to perceive this as two objects situated at the same distance.

Ultimately, a present lidar light signal from a lidar light transducer can be guided by an amplifier, a comparator and a retardation member into an LED driver or laser diode driver, wherein the LED driver subsequently activates an LED in an optical system and the laser diode driver activates a laser diode in the optical system. By all means, the aforementioned optical fiber cables can also be considered as the optical system. The difference of this arrangement purely lies in the fact that any other produced light signal or further light signal is used in the above-described alternative, independently of the lidar light signal. In this exemplary embodiment, the lidar light signal, present in any case in these lidar systems, is used or redirected.

BRIEF DESCRIPTION OF THE DRAWINGS

Further advantages, features and details of the invention will become apparent from the following description of preferred exemplary embodiments and from the drawings, in which.

DETAILED DESCRIPTION

Figure 1:
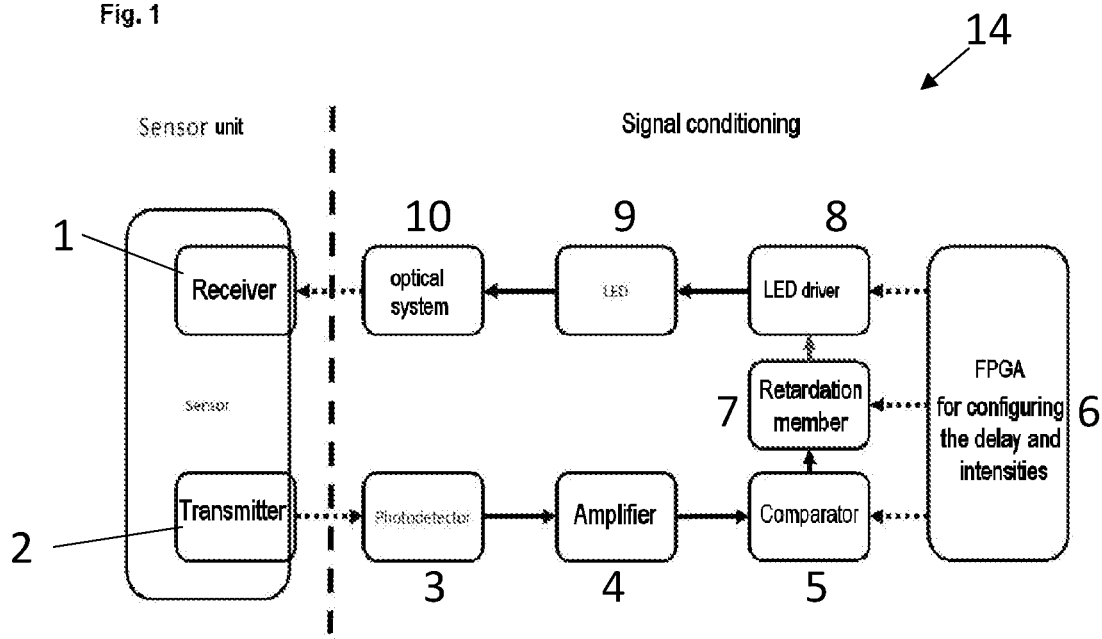
FIG. 1 shows a schematic view of connections.

FIG. 1 shows a schematic view of connections for the exemplary embodiment wherein there is not only a lidar light reception sensor 1 of a lidar light measurement system 14, but also a lidar light transducer 2.

In such a case, the emitted lidar light signal of the lidar light transducer 2 is initially guided into a photodetector 3. Electronic components that convert light into an electrical signal using the photoelectric effect or that have an electrical resistance that depends on the incident radiation are referred to as photodetectors, or else as light sensors or optical detectors, optoelectronic sensors. However, the term also denotes applications that have such a radiation-measuring component integrated therein.

The signal recorded by the photodetector 3 is subsequently forwarded to an amplifier 4, which strengthens the signal and amplifies the latter for further processing.

Then, the signal is forwarded into a comparator 5. Here, a computer 6 monitors the comparator 5 and the forwarding of the signal to a retardation member 7, which forwards, with different temporal retardation, the forwarding of the signal to an LED driver 8 in a defined form and in a manner influenced by the computer 6.

The LED driver 8, in turn, brings an LED 9 for emitting the signal in an optical system 10 to shine. After the signal was converted into a light signal by the LED in the optical system 10, the lidar light reception sensor 1 receives the light signal of the optical sensor 10.

Figure 2:
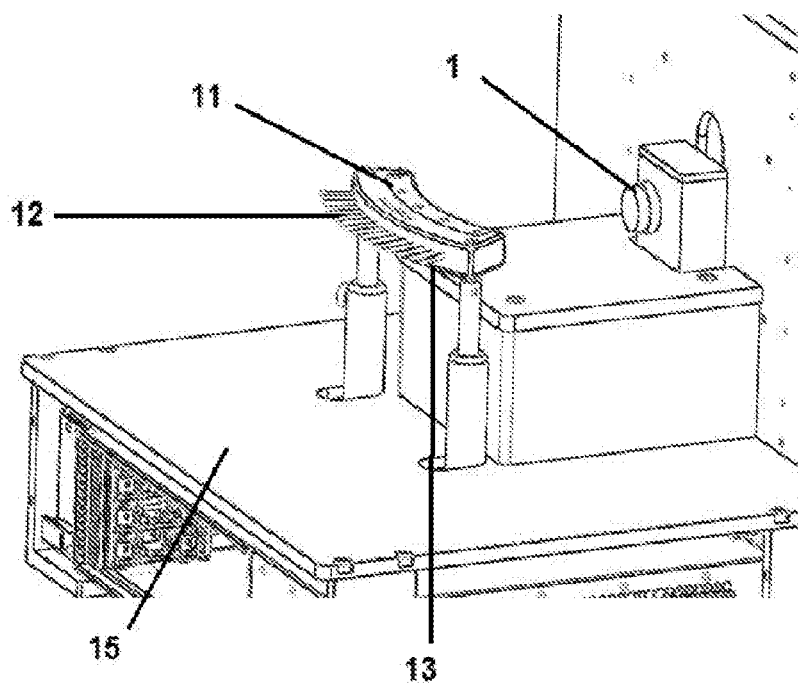
FIG. 2 shows a perspective view of a simulation apparatus according to the invention.

FIG. 2 further shows a simulation apparatus that is arranged on a common ground 15. Here, the lidar light reception sensor 1 is arranged at a certain distance from the ground 15. Moreover, a holder 11 is shown, said holder serving to receive the light transmitter 12 or the further light transmitter 13. Additionally, a multiplicity of other light transmitters can be attached, which are not denoted in any more detail although they are shown in FIG. 2.

In another exemplary embodiment, the holder 11 can also have an embodiment tilted through 90° if the light reception sensor 1 should receive not only horizontal light signals but also vertical light signals. A combination of the horizontal optical system 10 and a further vertical optical system can also come into question. Here, the horizontal and/or vertical arrangement should be understood as being in the plane of the light reception sensor 1.

The light transmitter 12 and the further light transmitter 13 are held in the same plane by the holder. In this exemplary embodiment, this means at the same distance from the ground 15. They are arranged next to one another. In turn, this means that the light transmitter 12 and the further light transmitter 13 are arranged here in a partial circular form with a centric alignment to the lidar light reception sensor 1.

Even though only one/some preferred exemplary embodiment/embodiments of the invention was/were described and presented, it is obvious that a person skilled in the art can add numerous modifications without departing from the essence and scope of the invention.

LIST OF REFERENCE SIGNS

| | |
|---|---|
| 1 | Lidar light reception sensor |
| 2 | Lidar light transducer |
| 3 | Photodetector |
| 4 | Amplifier |
| 5 | Comparator |
| 6 | Computer |
| 7 | Retardation member |
| 8 | LED driver |
| 9 | LED |
| 10 | Optical system |
| 11 | Holder |
| 12 | Light transmitter |
| 13 | Further light transmitter |
| 14 | Lidar light measurement system |
| 15 | Ground |

The invention claimed is:

1. A simulation apparatus for a lidar light management system, comprising:
a lidar light reception sensor (1) positioned at a known height above a ground (15);
a light transmitter (12) and a further light transmitter (13) arranged on a holder (11), the holder being configured to position the light transmitter (12) and the further light transmitter (13) at a same height above the ground (15) as the lidar light reception sensor (1);
wherein the holder (11) is curved defining a convex surface facing the lidar light reception sensor (1), and wherein the light transmitter (12) and the further light transmitter (13) are positioned on the holder to be in a plane with the lidar light reception sensor (1).

2. Simulation apparatus according to claim 1, wherein light transmitter (12) and the further light transmitter (13) are part of an optical fiber.

3. Simulation apparatus according to claim 1, further comprising a computer (6), which controls the lidar light reception sensor (1).

4. Simulation apparatus according to claim 3, wherein the computer (6) controls the light transmitter (12) and the further light transmitter (13).

5. Simulation apparatus according to claim 3, wherein the computer (6) monitors enablement of the lidar light reception sensor (1) and a time interval for emitting a light signal by way of the light transmitter (12) and/or the further light transmitter (13) and registers a signal input of a light signal from the light transmitter (12) or the further light transmitter (13).

6. Simulation apparatus according to claim 1, wherein a lidar light signal from a lidar light transducer (2) is activatable in the light transmitter (12) and/or further light transmitter (13) by an amplifier (4), a comparator (5), a retardation member (7) and an LED driver (8), an LED (9) or a laser diode driver or a laser diode.

7. The simulation apparatus according to claim 1, wherein the light transmitter (12) and the further light transmitter (13) are aligned statically in the holder in a circumference of up to 360°, and are positioned centrically with respect to the lidar light reception sensor (1).

8. The simulation apparatus according to claim 1, wherein the holder can be arranged horizontally or vertically in relation to the lidar light reception sensor.

9. A method for simulating a detection environment for a lidar light reception sensor (1) having a light transmitter (12) and a further light transmitter (13), both mounted to a holder (11), comprising the following steps:
positioning the holder (11) at a same position above ground as the lidar light reception sensor (1), wherein the holder is a curved member having a concave surface facing toward the lidar light reception sensor (1), and wherein the holder holds the light transmitter (12) and the further light transmitter (13) on a plane with the lidar light reception sensor (1);
activating the light reception sensor (1);
emitting a light signal from the light transmitter (12) after a defined time; and
emitting a further light signal from the further light transmitted (13) after a further activation of the lidar light reception sensor (1), wherein the lidar light reception sensor (1) registers the further light signal.

10. Method according to claim 9, wherein a lidar light signal of a lidar light transducer (2) is guided through a photodetector (3), an amplifier (4), a comparator (5) and a retardation member (7) into an LED driver (8) or a laser diode driver and the LED driver (8) or the laser diode driver subsequently activates an LED (9) or a laser diode in an optical system (10).

* * * * *